(12) United States Patent
Yasuda et al.

(10) Patent No.: US 8,712,480 B2
(45) Date of Patent: Apr. 29, 2014

(54) MOBILE COMMUNICATION APPARATUS

(75) Inventors: Chikara Yasuda, Tokyo (JP); Shusaku Tsuge, Kanagawa-ken (JP); Akemi Toyokura, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 507 days.

(21) Appl. No.: 12/555,081

(22) Filed: Sep. 8, 2009

(65) Prior Publication Data

US 2010/0062749 A1   Mar. 11, 2010

(30) Foreign Application Priority Data

Sep. 5, 2008   (JP) ................................ 2008-228939

(51) Int. Cl.
*H04B 1/38* (2006.01)
*H04W 4/00* (2009.01)

(52) U.S. Cl.
USPC ........................................ 455/567; 455/432.1

(58) Field of Classification Search
USPC ................ 455/432.1, 550.1, 565–567, 412.1, 455/412.2, 425, 552.1, 553.1, 404.1, 455/414.1–415, 418–422.1, 456.1–459, 455/466, 551; 370/310.2, 328, 338, 370/351–356; 379/68–70, 76, 81, 82, 379/88.19, 88.2, 88.21, 88.23, 8.24
See application file for complete search history.

(56) References Cited

U.S. PATENT DOCUMENTS

| | | | | |
|---|---|---|---|---|
| 5,559,860 A | * | 9/1996 | Mizikovsky | ................... 455/413 |
| 5,815,808 A | * | 9/1998 | Valentine | ................... 455/422.1 |
| 6,208,872 B1 | * | 3/2001 | Schmidt | ................. 455/518 |
| 6,301,338 B1 | * | 10/2001 | Makela et al. | ............. 379/88.21 |
| 6,934,543 B2 | * | 8/2005 | Wang et al. | ................... 455/433 |
| 2002/0123333 A1 | * | 9/2002 | Sato | ............................. 455/415 |
| 2006/0291640 A1 | * | 12/2006 | Nagesh et al. | ........... 379/211.02 |
| 2007/0297582 A1 | * | 12/2007 | Tuli | ............................... 379/111 |
| 2008/0037744 A1 | * | 2/2008 | Fux et al. | ................. 379/201.01 |

FOREIGN PATENT DOCUMENTS

| | | |
|---|---|---|
| JP | 10-173772 | 6/1998 |
| JP | 10-304452 A | 11/1998 |
| JP | 2001-257781 A | 9/2001 |
| JP | 2002-291052 A | 10/2002 |
| JP | 2003-125066 A | 4/2003 |
| JP | 2004-320456 | 11/2004 |
| JP | 2005-085684 A | 3/2005 |
| JP | 2006-217268 A | 8/2006 |
| JP | 2007-221593 | 8/2007 |

OTHER PUBLICATIONS

JP Office Action mailed on Dec. 11, 2012 in application No. 2008-228939.

* cited by examiner

*Primary Examiner* — San Htun (74) *Attorney, Agent, or Firm* — Maschoff Brennan (57) ABSTRACT

A communication apparatus such as a cellular phone is described in which a control unit judges, when an incoming call is received, whether a sounding unit or a vibrating unit is to be activated for announcing the reception of the incoming call. The control unit determines that the announcing of the reception is prohibited if the mobile communication apparatus is in a roaming area. When the announcing of the reception is prohibited, the control unit sends a message, showing that the reception of the incoming call is unavailable, to a calling party.

5 Claims, 8 Drawing Sheets

MOBILE COMMUNICATION APPARATUS

CROSS-REFERENCE TO RELATED APPLICATIONS

This application is based upon and claims the benefit of priority from prior Japanese Patent Application No. 2008-228939, filed Sep. 5, 2008, the entire contents of which is incorporated herein by reference.

BACKGROUND OF THE INVENTION

1. Field of the Invention

Exemplary embodiments of the present invention relate to a mobile communication apparatus having a roaming function that enables the mobile communication apparatus to use a communication service provided by plurality of telephone carriers.

2. Description of the Related Art

In recent years, a mobile communication apparatus, such as a cellular phone, includes functions to make a phone call and a video-phone call, and to send and receive an email such as a SMS (Short Message Service) and a MMS (Multimedia Messaging Service), when the mobile communication apparatus resides in an area where the mobile communication apparatus can connect to a base station via a radio channel. However, there is an inconvenience that the mobile communication apparatus receives the phone call and/or email even when reception of the message is not desired by a user.

Also, a mobile communication apparatus having the roaming function has been in practice use. For example, it is assumed that a user travels abroad bringing his/her cellular phone with a roaming function. In this case, if the cellular phone receives a phone call from another cellular phone in a home country and makes a phone communication with a user of the another cellular phone, both the calling user and called user bear the cost of the communication. However, if the user sets the cellular phone to refuse any reception without condition while the user is in a foreign country, a calling party has no idea when an outgoing call should be executed. Therefore, the calling party has to try to make outgoing calls many times.

As for a technique that restricts reception of an incoming call and email reception, Jpn. Pat. Appln. KOKAI Publication No. 10-173772 (Hirose et al) describes a communication terminal which allows for reception of the incoming communication from a specific person and within a specific time frame. Also, Jpn. Pat. Appln. KOKAI Publication No. 2007-221593 (Watanabe) describes a reception control apparatus that refuses an incoming communication except when the incoming communication is received within a specific time frame, and further automatically adjusts a clock to a foreign time and controls the incoming based on the adjusted clock.

However, to avoid an unintentional incoming communication and to deter an occurrence of a calling rate while roaming, it is important to inform the caller that the apparatus resides in the roaming area and no reception is acceptable except for the specific time frame.

BRIEF SUMMARY OF THE INVENTION

Exemplary embodiments of the present invention provide a mobile communication apparatus that includes a control unit that detects whether the mobile communication apparatus is in a roaming area when an incoming call is received, prohibits the mobile communication terminal from outputting an announcement indicating the reception of the incoming call when it is detected that the mobile communication apparatus is in the roaming area, and sends a message showing that the reception of the incoming call is unavailable to a calling party.

BRIEF DESCRIPTION OF THE SEVERAL VIEWS OF THE DRAWING

The accompanying drawings, which are incorporated in and constitute a part of the specification, illustrate exemplary embodiments of the invention, and together with the general description given above and the detailed description of the exemplary embodiments given below, serve to explain the principles of the invention.

DETAILED DESCRIPTION OF THE INVENTION

Exemplary embodiments of the present invention will be described hereinafter with reference to the accompanying drawings.

Figure 1:
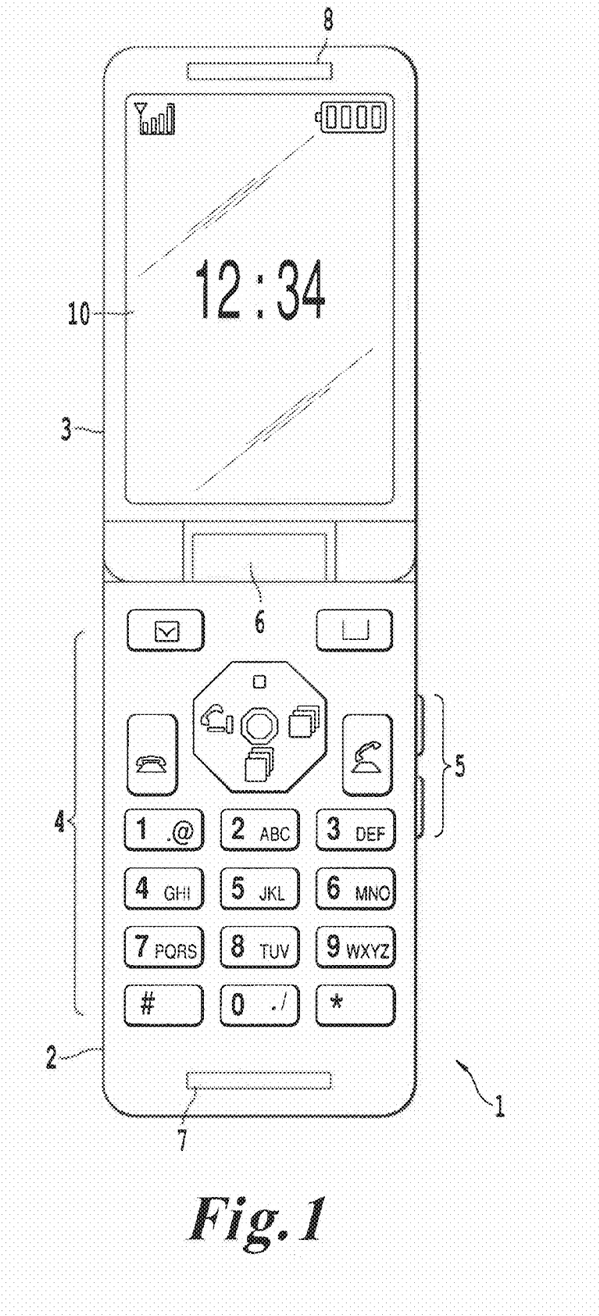
FIG. 1 shows an exemplary appearance of a cellular phone.

As an example of a communication apparatus, a cellular phone 1 is described in this embodiment. FIG. 1 shows an exemplary arrangement of the cellular phone 1.

As shown in FIG. 1, the cellular phone 1 is composed of a first housing 2 and a second housing 3, and both housings are rotatably connected via a hinge unit 6. Also, inside of the cellular phone 1, an antenna (an antenna 21 in FIG. 3) is installed for communicating with a base station.

The front surface of the first housing 2, for example, is equipped with a key pad 4 which may includes digit keys from 0 to 9 for inputting numbers and characters, a send key for making an outgoing call, a redial key, a power key for turning on and off the cellular phone 1, a clear key, and a menu key. Also, side keys 5 are installed on the side surface of the first housing 2, such that a user can manipulate the side keys 5 even when the cellular phone 1 is in the closed state. A user may input plural instructions by manipulating the key pad 4 and the side keys 5. This listing of keys is exemplary, and those skilled in the art would appreciate that additional keys may be present.

Also, a microphone 7 for capturing a voice is installed at a lower portion of the key pad 4.

Furthermore, there is a battery space on a back surface of the cellular phone 1 to accommodate a battery 9. Electric power is supplied to each circuit from the battery 9 when the cellular phone 1 is turned on in response to depression of the power key.

A front surface of the second housing 3 is equipped with a display unit 10 for displaying mail messages, web information, and a menu screen in addition to a reception condition (RSSI) of a radio signal from the base station and a remaining battery level. The display unit 10 may be an LCD (Liquid Crystal Display) or OEL (Organic Electro Luminescence) display.

Also, a speaker 8 for outputting a voice is installed at an upper portion of the display unit 10. Furthermore, a sub-display for displaying the reception condition and the remaining battery level may be installed on the back surface of the second housing 3.

Figure 2:
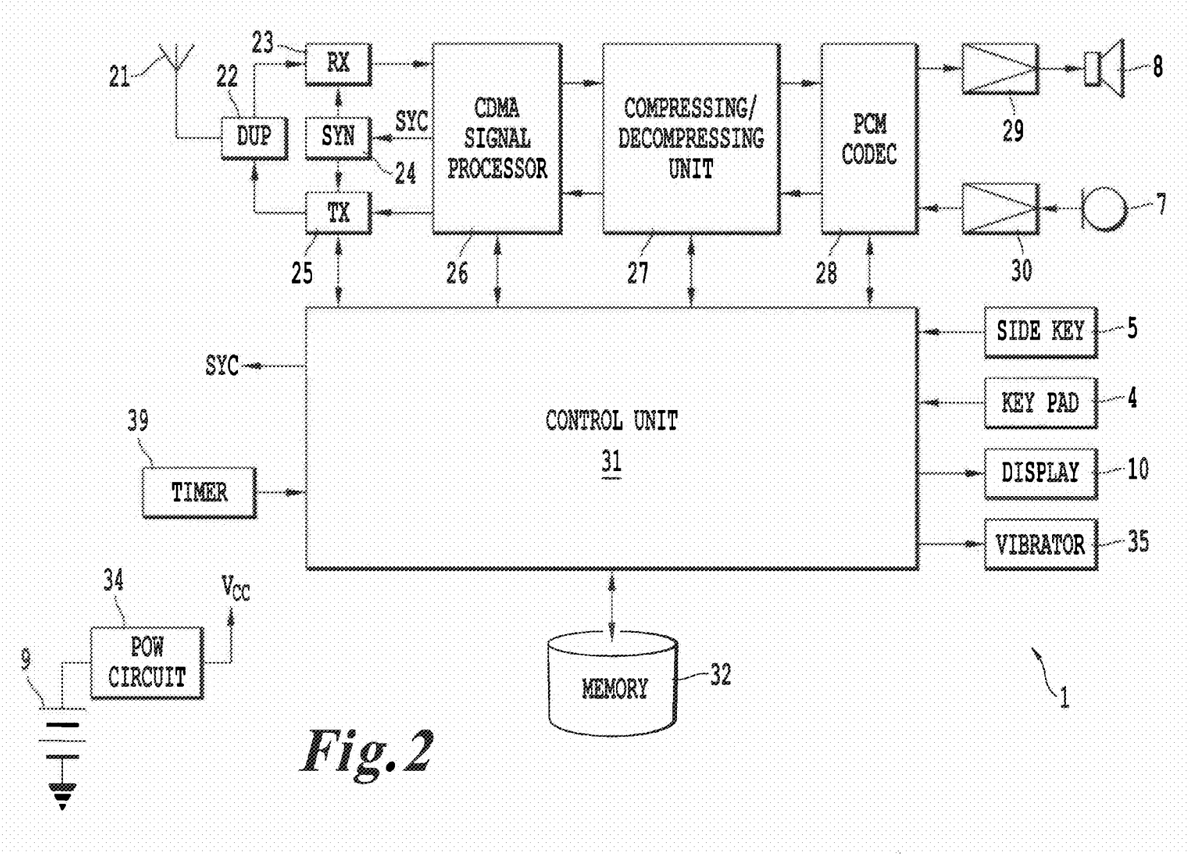
FIG. 2 is a block diagram of the cellular phone according to the exemplary embodiment.

FIG. 2 is a block diagram showing an inner composition of the cellular phone 1.

The radio signal from a base station is received by the antenna 21, and thereafter the radio signal is inputted to a reception circuit (RX) 23 via a duplexer (DUP) 22. The DUP 22 mixes the radio signal with a local oscillation signal outputted from a frequency synthesizer (SYN) 24, and generates an intermediate frequency signal. The intermediate frequency signal is orthogonally demodulated into a baseband signal by the RX 23.

The SYN 24 is controlled by a control signal SYC outputted from a control unit 31.

The baseband signal outputted from RX 23 is inputted to a CDMA signal processor 26. The CDMA signal processor 26 despreads the baseband signal by using a spreading code and generates a plurality of packets. Each packet may contain one of moving picture data, still picture data, music data, speech data, message data, and control data. If the packet contains moving picture data, still picture data, music data, or speech data, the packet is inputted to a compressing/decompressing unit 27.

The compressing/decompressing unit 27 may be a DSP (Digital Signal Processor) and may include multiplexing/demultiplexing module, a speech/audio coding module, and a video coding module. When the compressing/decompressing unit 27 receives the packet from the CDMA signal processor 26, the moving picture data, the still picture data, the music data, and the speech data is divided by the multiplexing/demultiplexing module. Subsequently, the moving picture data and the still picture data are decoded by the video coding module to generate digital video picture data or digital still picture data, and the music data and the speech data are decoded by the speech/audio coding module to generate digital music data or digital speech data.

The digital video picture data and the digital still picture data are inputted to the control unit 31 and, under the control of the control unit 31, are displayed on the display unit 10. The digital music data and the digital speech data are inputted to a PCM codec 28. Thereafter, the digital music data and the digital speech data are amplified by an amplifier 29 and output to the speaker 8.

On the other hand, the user's voice captured by the microphone 7 is amplified by an amplifier 30, and thereafter converted into digital speech data by the PCM codec 28. The digital speech data is inputted to the compressing/decompressing unit 27. Text data such as an email data generated by the control unit 31 also inputted to the compressing/decompressing unit 27.

The speech/audio coding module of the compressing/decompressing unit 27 codes the digital speech data from the PCM codec 28 and generates speech data to be transmitted. Also, digital moving data outputted from the control unit 31 is coded by the video coding module of the compressing/decompressing unit 27 and moving data is generated. The generated speech data and moving data are multiplexed by the multiplexer, and thereafter packetized by the compressing/decompressing unit 27. The packets generated by the compressing/decompressing unit 27 are inputted to the CDMA signal processor 26.

The CDMA signal processor 26 spreads the packets outputted from the compressing/decompressing unit 27 by using a spreading code assigned to a transmission channel, and generates a transmission signal. The transmission signal is inputted to a transmission circuit (TX) 25. The TX 25 modulates the transmission signal according to a digital modulation method such as a QPSK (Quadrature Phase Shift Keying) method, and thereafter frequency converts the modulated transmission signal into radio signal based on the local oscillation signal outputted from the SYN 24. Thereafter, under the control of the control unit 31, the radio signal is amplified to a given transmission power level by the TX 25. The amplified radio signal is inputted to the antenna 21 via the DUP 22, and transmitted to the base station.

The control unit 31 is composed of a CPU (Central Processing Unit), a ROM (Read Only Memory), a RAM (Random Access Memory), and other electronic circuits. The CPU executes plural processing according to programs stored in the ROM and application programs loaded to the ROM from a memory unit 32, generates control signals, and transmits the control signal to each circuit. Thus, the control unit 31 controls the entire cellular phone 1. The ROM stores data the CPU uses to execute processing. Also, the control unit 31 is equipped with a video-RAM to store image data to be displayed on the display unit 10.

The memory unit 32 may be a Flash memory such as a nonvolatile memory with electrically rewritable and erasable or a HDD (Hard Disk Drive), and stores plural application programs and data to be executed by the CPU of the control unit 31.

A clock generator (Timer) 39 periodically supplies signal to the control unit 31. The control unit 31 may use the signal from the clock generator 39 to manage a clock.

The power circuit 34 generates the electric power based on the voltage output of the battery 9 and supplies the electric power to each circuit.

Figure 3A:
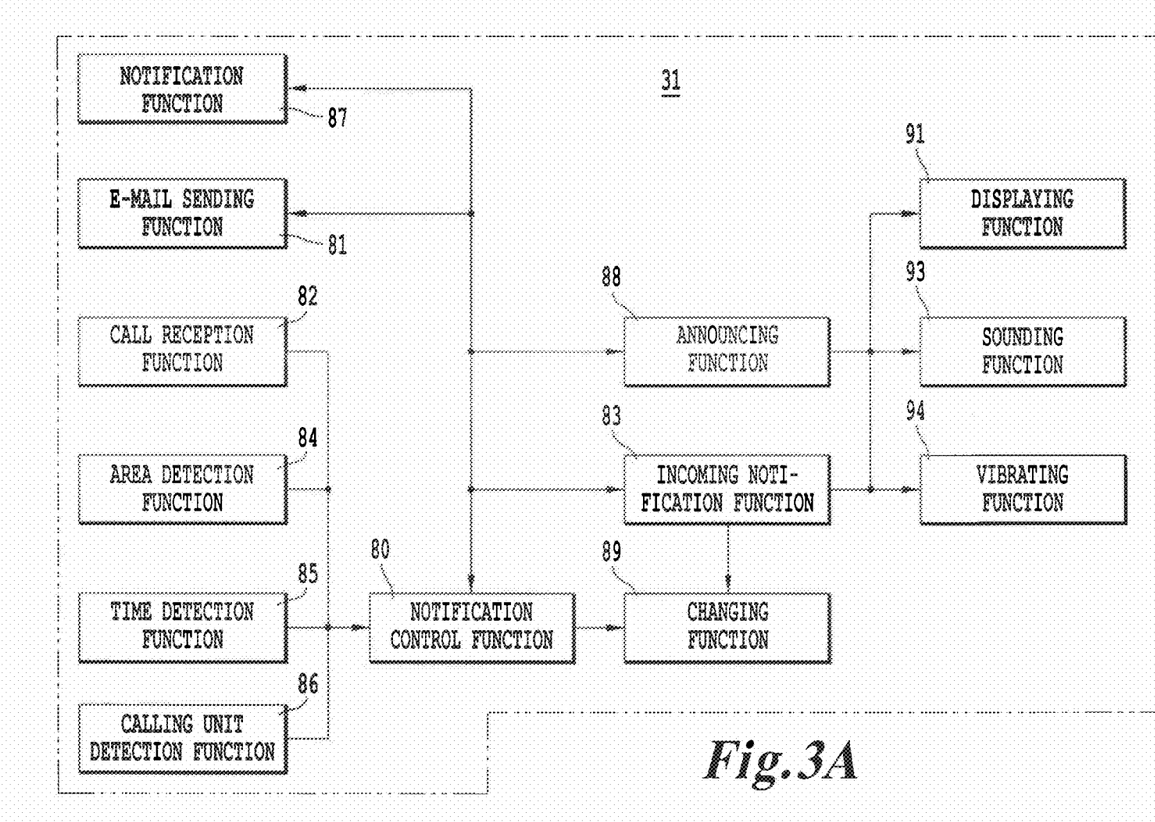
FIGS. 3A and 3B are a functional diagram of a control unit of the cellular phone according to an exemplary embodiment.
Figure 3B:
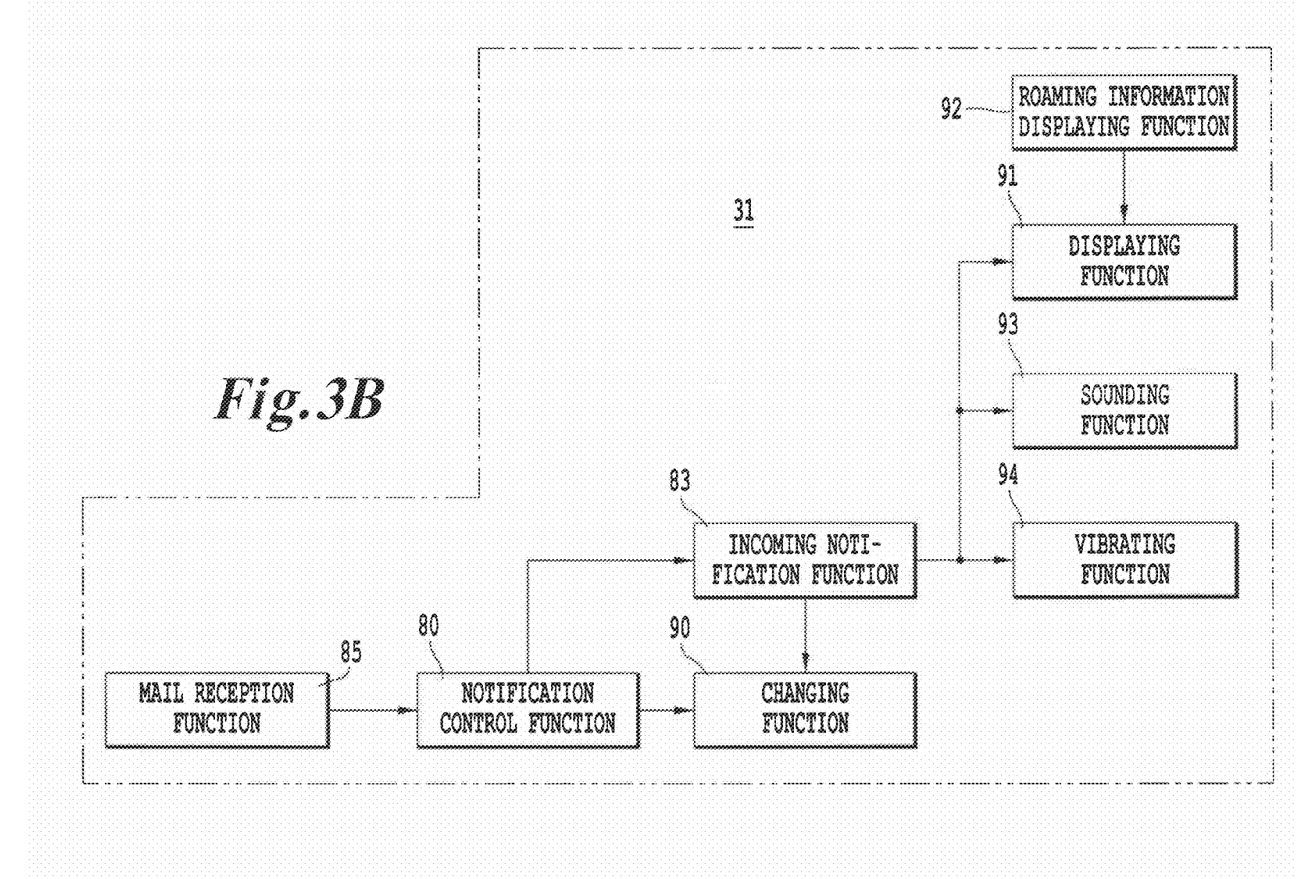

Next, with reference to FIGS. 3A and 3B, functions executed by the control unit 31 are explained. FIG. 3A shows the functions executed when the cellular phone 1 receives an incoming call and an email message. FIG. 3B shows the functions when the cellular phone 1 makes an outgoing call and sends an email.

As shown in FIG. 3A, the control unit 31 includes a notification control function 80, a mail sending function 81, a call reception function 82, an incoming notification function 83, an area detection function 84, a time detection function 85, a calling unit detection function 86, a notification function 87, an announcing function 88, a changing function 89, a displaying function 91, a sounding function 93, and a vibrating function 94. On the other hand, as shown in FIG. 3B, the control unit 31 includes the notification control function 80, the incoming notification function 83, a prohibition notification function 90, the displaying function 91, a roaming information displaying function 92, the sounding function 93, the vibrating function 94, and an email reception function 95. These functions may be realized by either a software product or a hardware product or a combination of both software and hardware.

The email sending function 81 is configured to send an email to another apparatus such as a cellular phone, personal computer, etc.

The call reception function 82 is configured to inform the notification control function 80 that an incoming call or email is received.

The incoming notification function 83 is configured to instruct the sounding function 93, the vibrating function 94, or the displaying function 91 to inform a user of the reception of an incoming call or email in response to an instruction from the notification control function 80. The incoming notification function 83 may instruct two or more functions in the sounding function 93, the vibrating function 94, and the displaying function 91 for notification according to a user's setting.

The area detection function 84 is configured to inform the notification control function 80 of a country to which the cellular phone 1 is located and/or a carrier code. The country code and the carrier code are contained in a radio signal transmitted from a base station.

The time detection function 85 is configured to inform the notification control function 80 of a present local time based on time information of the clock or a standard time contained in a radio signal transmitted from a base station.

The calling unit detection function 86 is configured to detect calling party information such as a telephone number or an email address contained in a paging signal from a base station when an incoming call or email addressing the cellular phone 1 occurs, and inform the notification control function 80 of the telephone number or the email address.

The notification function 87 is configured to transmit information that the cellular phone 1 is in a roaming state, a notification that an incoming call or email is invalidated, and the reason for this invalidation to a calling party in response to an instruction from the notification control function 80.

The announcing function 88 is configured to announce that the cellular phone 1 is in a roaming state and provide a notification that an incoming call or email is invalidated, and the reason for this invalidation, to the calling party by the notification function 87 in response to an instruction from the notification control function 80.

The changing function 89 is configured to set one of allowance and prohibition of the notification of an incoming call and/or email by outputting a sound or vibration in response to an instruction from the notification control function 80.

The prohibition notification function 90 is configured to instruct the incoming notification function 83 to inform, via an output of sound or vibration, that the cellular phone 1 is in a roaming state and the notification is invalidated.

The roaming information displaying function 92 is configured to instruct the displaying function 91 to display information contained in a transmitted email, for example, when a called cellular phone is in a roaming state.

The sounding function 93 is configured to control the speaker 8 to output an alarm sound, a melody, or an audio guidance to inform the user in response to a notification from the incoming notification function 83.

The vibrating function 94 is configured to activate the vibrator 35 to inform the user in response to a notification from the incoming notification function 83.

The email reception function 95 is configured to inform the incoming notification function 83 that an email is received.

Needless to say, the cellular phone 1 may include all, or a portion of, the functions described in FIGS. 3A and 3B.

Figure 4:
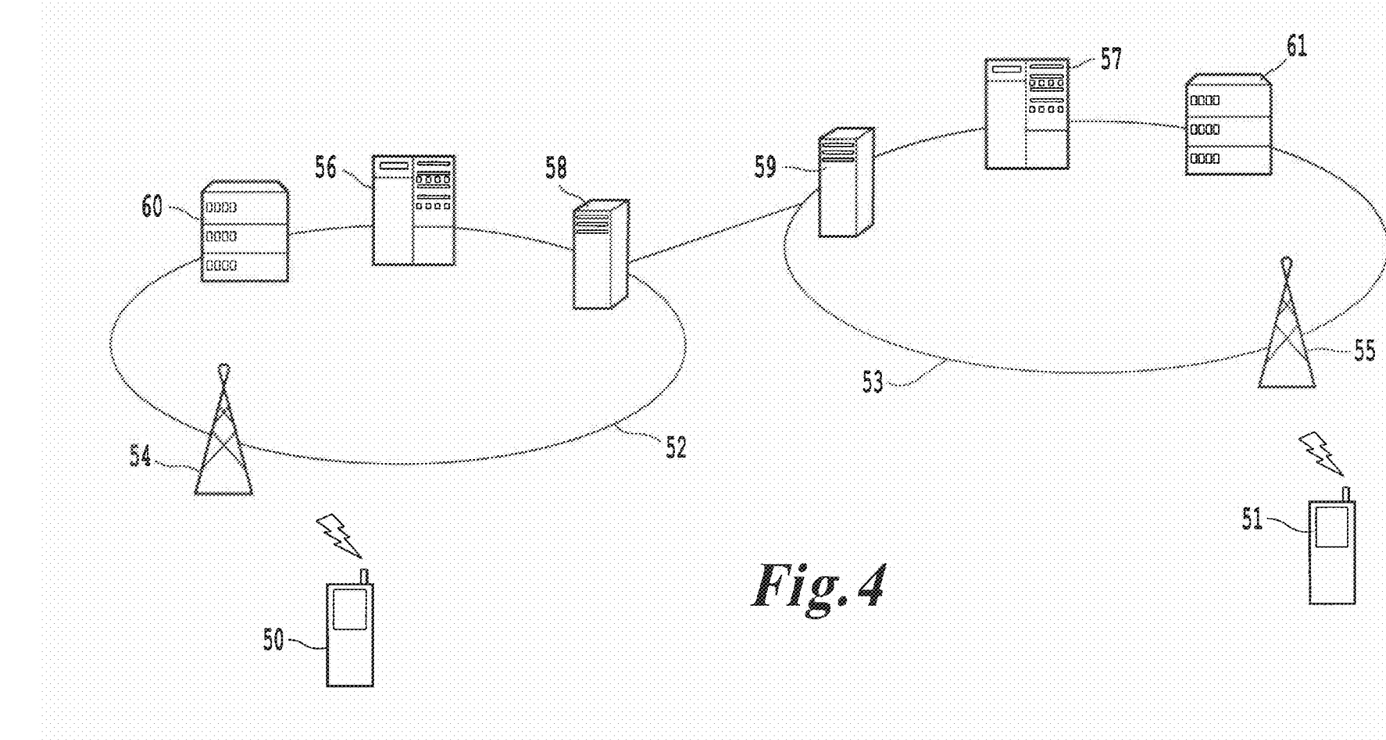
FIG. 4 is a block diagram showing an exemplary system composition.

FIG. 4 shows an exemplary network composition to realize a roaming communication over networks, each belongs different telecommunication carriers. As shown in FIG. 4, a cellular phone 50 and a cellular phone 51 communicate over the networks. Each network 52 or 53 includes a base station 54 or 55, control equipment 56 or 57, switching equipment 58 or 59, and message storing equipment 60 or 61.

The exchanging equipment manages line connections in the network or over the networks, and controls the circuit switching service. The control equipment manages location information where a cellular phone resides, and controls the exchanging equipment to establish a line to the called cellular phone in response to reception of an outgoing call. The message storing equipment temporarily stores email and voicemail. The base station converts information signals received from the network into radio signals and transmits the radio signals to the cellular phone and vise versa.

Figure 5:
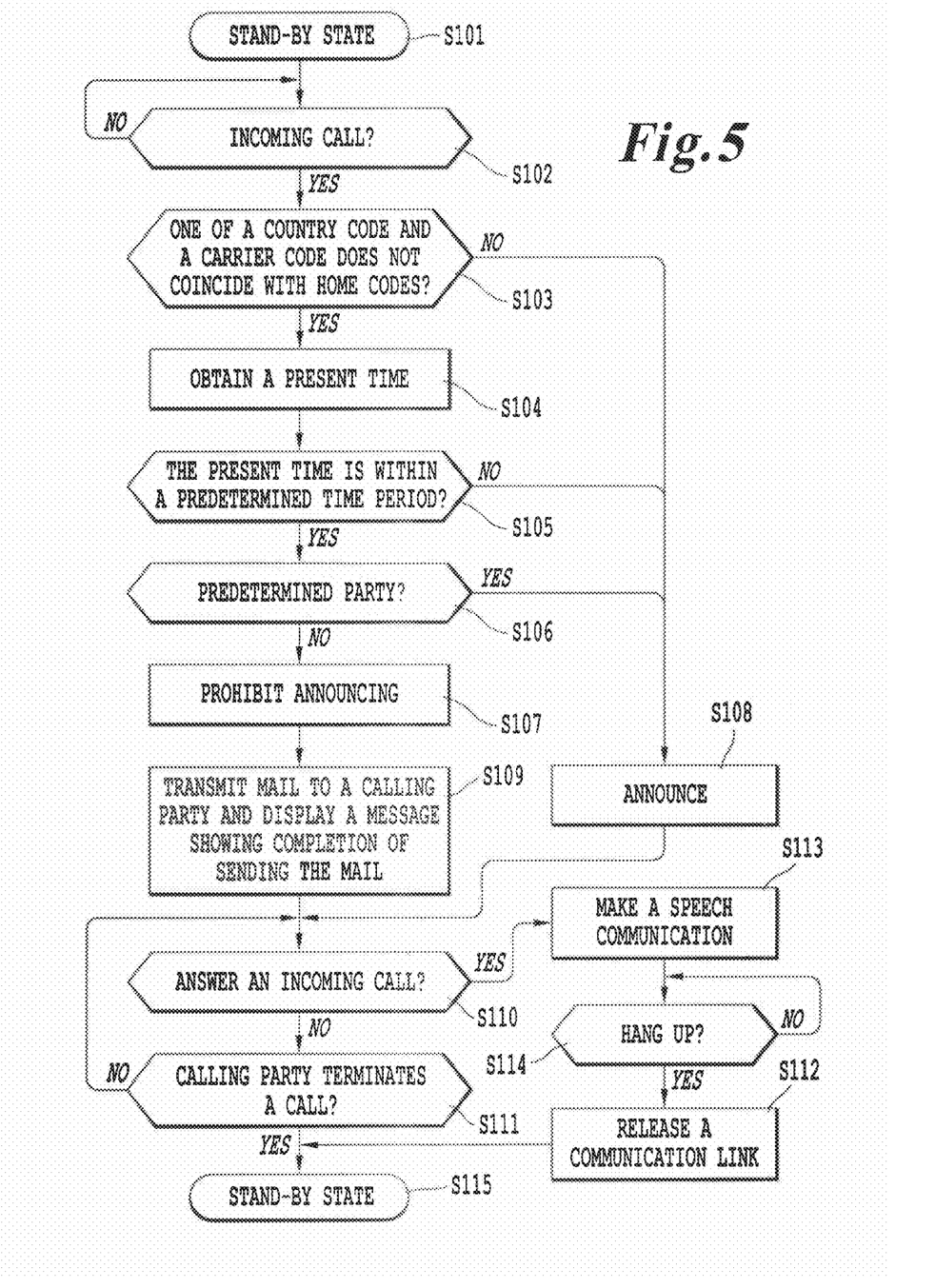
FIG. 5 is a flowchart showing a procedure for responding to an incoming call while roaming according to an exemplary embodiment.

Next, with reference to FIG. 5, a reception control processing executed by the cellular phone 51, which receives an incoming call from the cellular phone 50, will be described.

If an outgoing call to the cellular phone 51 in a roaming network is made by the cellular phone 50 in a home network, the outgoing call is received by the control equipment 56 via the base station 54, and a procedure to establish a communication link is executed by the control equipment 56 and the control equipment 57.

Initially, at step S101, the cellular phone 51 is in a stand-by state after synchronizing with a base station. After a communication link is established, the outgoing call is received by the cellular phone 51 as an incoming call (Step S102). If the incoming call is received by the cellular phone 51, the area detection function 84 of the cellular phone 51 extracts the country code and the carrier code from the incoming call and compares the extracted country code and the carrier code with a home country code and a home carrier code stored in a memory unit 32 in step S103. If one of the extracted country code and carrier code do not coincide with the home country code and the home carrier code, the process goes to Step S104. In step S104, the time detection function 83 obtains a present time based on the signal outputted from the clock generator 39. Thereafter, in step S105, the notification control function 80 checks whether the present time is within a preset time period which is a rejection condition of the incoming call and the reception of email set by a user. If the present time is within the preset time period, the notification control function 80 further checks whether a calling party contained in the incoming call coincides with any one of preset parties in the memory unit 32 in step S106. The preset parties in the memory unit 32 are set by the user, and an incoming call and an email containing a party in coincidence with any one of the preset parties is always receivable. If the calling party does not coincide with any one of the preset parties, the process goes to step S107, then the changing function 89 sets the prohibition of the notification and the notification control function 80 sends no instruction to the sounding function 93 and the vibrating function 94. On the other hand, if the extracted country code and carrier code coincide with the stored country code and carrier code, the present time is not within the preset time period, or the calling party coincides with any one of the preset parties, the process goes to step S108.

Incidentally, in step S103, the notification control function 80 may compare the extracted country code and carrier code with a country code and a carrier code to detect whether the cellular phone 51 is located in the area to reject the reception of the incoming call and the email. If at least one of the extracted country code and the carrier code coincide with the country code and the carrier code in the memory, the notification control function 80 recognizes that the cellular phone 51 is located in the area to reject the reception, then the process goes to step S104.

Also, in the above example, both the time and the calling party are checked in steps S105 and S106. However, either step S105 or step 106 can be omitted.

In step S108, the incoming notification function 83 of the cellular phone 51 instructs at least one of the sounding function 93, the vibrating function 94, and the displaying function 91 to inform a user of the reception of the incoming call. When the user answers the incoming call by depressing the send key in the key pad 4, in step S110, a speech communication is made between the cellular phone 50 and the cellular phone 51 after a speech communication link is established between the cellular phone 50 and base station which transmits the incoming call, in step S113, then the control unit 31 waits for the termination of the speech communication, in step S114. If a user of the cellular phone 50 or the user of the cellular phone 51 hangs up, the speech communication link is released, in step S112, and the cellular phone 51 goes to a stand-by state, in step S115. Also, in step S111, if the user of the cellular phone 50 terminates the outgoing call while the user does not answer the incoming call the process goes to step S115.

On the other hand, after step S107, the notification function 87 of the cellular phone 51, in response to an instruction from the notification control function 80, sends to the cellular phone 50 an email showing the caller that the cellular phone 51 is in a roaming state, or it's bad time to receive a call. For example, the email may contain a message that "I cannot receive a call since I'm not staying at home.", "The local time here is 12:00 a.m.", or "Please call me between 23:00-8:30." Then, the announcing function 88, in response to an instruction from the notification control function 80, displays a message that the email has been sent to the calling party on the display unit 10, in step S109. The message may include information, such as a calling party's name, a telephone number, and a reception data and time. Thereafter, the same steps S110 through S115 described above follow.

Above example shows the case that the cellular phone 50 makes the phone call to the cellular phone 51. However, if the cellular phone 50 sends an email, such as a SMS (Short Message Service) using a circuit switching protocol, to the cellular phone 51, the email, showing the caller that the cellular phone 51 is in a roaming state, or it's bad time to receive a call, can be transmitted via a circuit line established according to the circuit switching protocol. In this case, the cellular phone 51 does not need to establish the circuit line for sending the email. Therefore, a network load can be reduced.

The above description shows an example in which the cellular phone 51 sends the email for rejecting the incoming call. However, an audio guidance may be reproduced for informing a calling party that a called party is in a roaming state, or it's bad time for the called party to receive a call. In this case, the audio guidance is recorded in the message storing equipment 60 by the user of the cellular phone 51, and the audio guidance may be reproduced when the cellular phone 51 does not answer an incoming call for a predetermined time period.

Next, with reference to FIG. 6, another embodiment will be described. In this embodiment, the email showing that the cellular phone 51 is in a roaming state, or it's bad time to receive a call is transmitted according to a paging time period.

Figure 6:
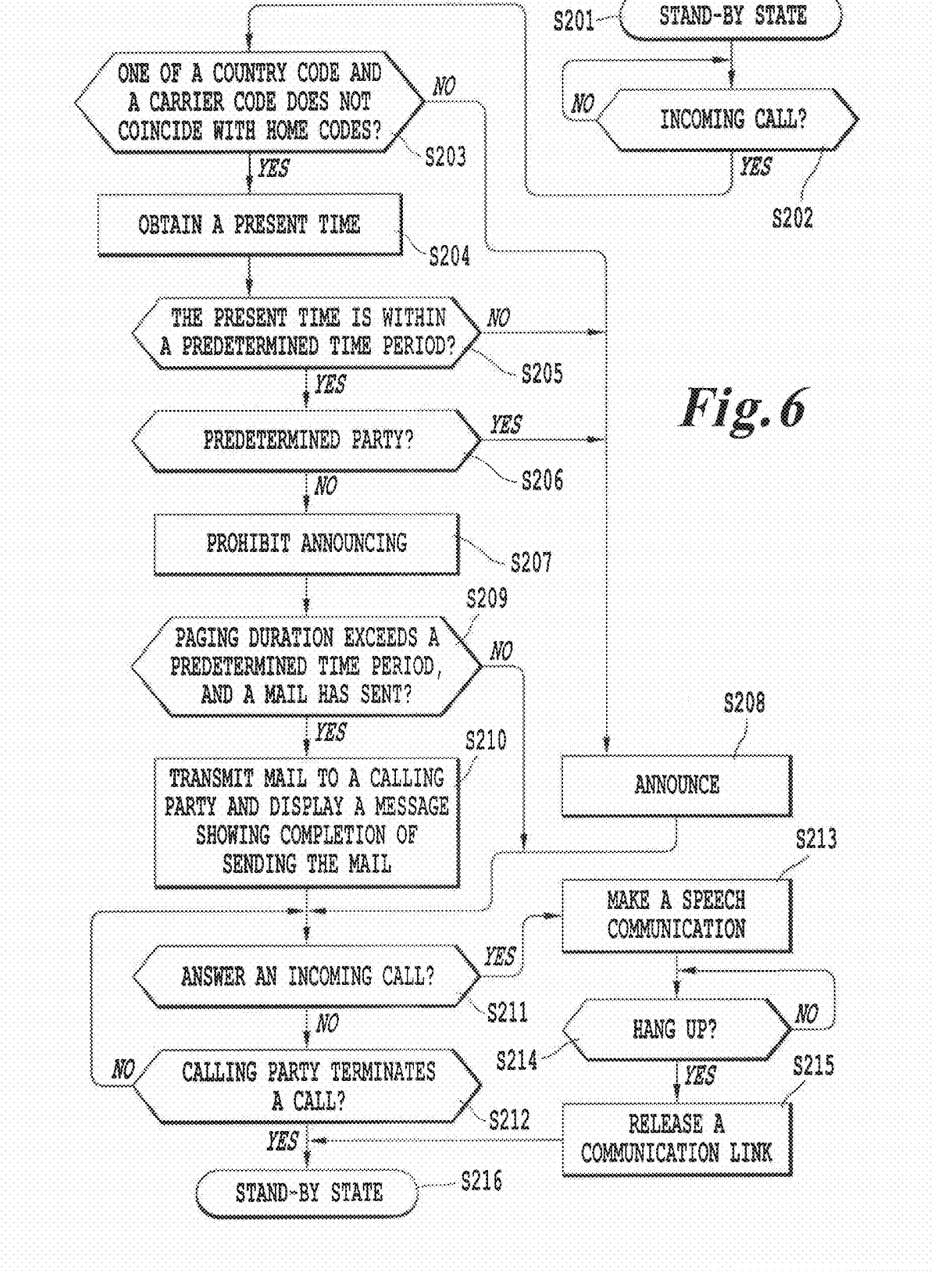
FIG. 6 is a flowchart showing a procedure of responding to an incoming call while roaming according to another exemplary embodiment.

In FIG. 6, steps S201 through S208, and S210 through S216 correspond to steps S101 through S108, and S109 through S115, respectively. Therefore, the explanation regarding steps S201 through S208 and S210 through S216 is omitted.

In step S209, the notification control function 80 judges whether paging duration exceeds a predetermined time period and whether the email showing that the called party is in a roaming state, or it's bad time for the called party to receive a call has been sent to the calling party. If the paging duration exceeds the predetermined time period and the email has been sent to the calling party, the process goes to step S210, then the email is sent to the cellular phone 50 and the message that an email has sent to the calling party is displayed on the display unit 10. On the other hand, if the paging duration does not exceed the predetermined time period or the email has never sent to the calling party, the process goes to step S211, then the control unit 31 waits for the depression of the send key or hanging up the cellular phone 50.

Incidentally, after the email has been sent to the cellular phone 50 in step S210, the control unit 31 of the cellular phone 51 may hang up automatically.

Also, if the outgoing call from the cellular phone 50 can convey a signal about whether emergency or not, the notification control function 80 of the cellular phone 51 may determine whether the email, showing that the called party is in a roaming state, or it's bad time for the called party to receive a call, should be sent based on the signal.

Thus, since the cellular phone 51 does not send the email in response to all incoming call from the cellular hone 50, the user of the cellular phone 51 saves communication fees, and a network load can be reduced.

Figure 7:
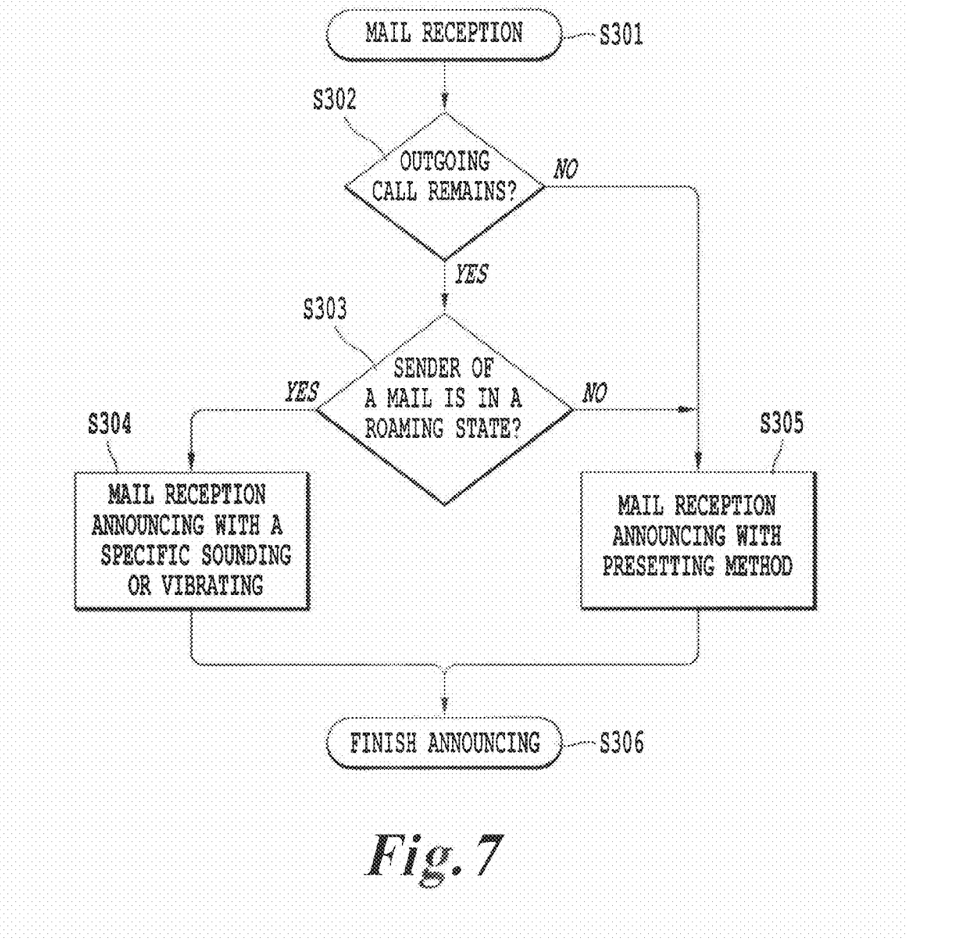
FIG. 7 is a flowchart showing a procedure for receiving an email responding to an outgoing call according to an exemplary embodiment.

Next, with reference to FIG. 7, a process performed by the cellular phone 50, which receives the email, showing that the called party is in a roaming state, or it's bad time for the called party to receive a call, will be described.

In step S301, when the call reception function 82 of the control unit 31 detects that an email, showing that the called party is in a roaming state, or it's bad time for the called party to receive a call, is received, the control unit 31 checks whether the outgoing call remains, in step S302. If the outgoing call remains, in step S303, the notification control function 80 checks whether the cellular phone 51 is in the roaming state. When the notification control function 80 detects that the cellular phone 51 is in the roaming state, the incoming notification function 83 instructs the sounding function 93 or the vibrating function 94 inform a user of the cellular phone 50 a reception of the email with a specific or predetermined sound or vibrating pattern, in step S304. In this case, the notification control function 80 may instruct the displaying function 91 to display a message contained in the received mail on the display unit 10.

If the email sent from the cellular phone 51 contains a flag indicating a roaming state, the notification control function 80 of the cellular phone 50 can detect that the cellular phone 51 is in the roaming state by checking the flag. The notification control function 80 of the cellular phone 50 may detect that the cellular phone 51 is in the roaming state by comparing address information contained in the outgoing call with address information contained in the received mail, or by comparing address information stored in the memory unit 32 as a phone book with the address information in the received mail. Furthermore, the notification control function 80 may detect that the cellular phone 51 is in the roaming state merely when the email is received from the cellular phone 51. Thereafter, the process goes to step S306, and notification by the sounding function 93 or the vibrating function 94 finished when a predetermined notification period has elapsed.

If the outgoing call remains (No in step S302) or the cellular phone 51 is not in the roaming state (No in step S303), then, in step S305 the notification control function 80 of the cellular phone 50 instructs the displaying function 91, the sounding function 93, or the vibrating function 94 in accordance with a predetermined setting for each address information. After appropriately announcing the reception of the email, the announcing process ends at S306.

Thus, the user of the cellular phone 50 can acknowledge the reason why the calling party does not answer the outgoing call.

In the above description, the cellular phone 1 is used to explain the embodiment. However, this invention can be applied to a PDA (personal Digital Assistance), a wired apparatus such as a land phone. Also, the cellular phone may be a slidable cellular phone or a bar-type cellular phone.

Furthermore, this invention can apply to a cellular phone which roams between telecommunication carriers in a domestic area.

What is claimed is:

1. A mobile communication apparatus, comprising:
a reception unit configured to detect that an incoming call is received from a calling apparatus;
an announcing unit configured to announce the reception of the incoming call detected by the reception unit;
a clock unit configured to generate clock information; and
a memory unit configured to store a time period during which an incoming call is denied and to store a home country code and a home carrier code corresponding to the mobile communication apparatus; and
a control unit configured to detect whether the mobile communication apparatus is in a roaming area when the incoming call is received, prohibit the announcing unit from announcing the reception of the incoming call when it is detected that the mobile communication apparatus is in the roaming area, determine a reason why the reception of the incoming call is denied, and send to the calling apparatus, an email indicating that the mobile communication apparatus is in the roaming area, and display on a display unit of the mobile communication apparatus a message indicating that the email has been sent to the calling apparatus,
wherein the control unit is configured to calculate a present time based on the clock information, compare the calculated present time with the time period in the memory unit, and prohibit the announcing unit from announcing the reception when it is detected that the mobile communication apparatus is in the roaming area and the calculated present time is within the time period, and
wherein the control unit detects whether the mobile communication apparatus is in the roaming area by comparing a country code and a carrier code contained in a signal received via the interface with the home country code and the home carrier code in the memory unit.

2. The mobile communication apparatus according to claim 1,
wherein the control unit is configured to obtain a local time from a radio signal received, compare the local time with the time period in the memory unit, and prohibit the announcing unit from announcing the reception when it is detected that the mobile communication apparatus is in the roaming area and the local time is within the time period.

3. The mobile communication apparatus according to claim 1, further comprising: a display unit configured to display information, wherein the control unit is configured to control the display unit to display the message showing that the reception of the incoming call is denied to the calling apparatus.

4. The mobile communication apparatus according to claim 3, wherein the message displayed on the display unit includes address information of the calling apparatus.

5. The mobile communication apparatus according to claim 1, wherein the message showing that the reception of the incoming call is denied to the calling apparatus is contained in an email message sent to the calling apparatus.

* * * * *